No. 771,008. PATENTED SEPT. 27, 1904.
J. GREGG.
BUNCHER FOR MOWING MACHINES.
APPLICATION FILED FEB. 19, 1904.
NO MODEL. 2 SHEETS—SHEET 2.

Witnesses
Howard W. Orr
B. G. Foster

John Gregg, Inventor,
By E. G. Siggers
Attorney

No. 771,008.

Patented September 27, 1904.

UNITED STATES PATENT OFFICE.

JOHN GREGG, OF STORMS, OHIO.

BUNCHER FOR MOWING-MACHINES.

SPECIFICATION forming part of Letters Patent No. 771,008, dated September 27, 1904.

Application filed February 19, 1904. Serial No. 194,400. (No model.)

*To all whom it may concern:*

Be it known that I, JOHN GREGG, a citizen of the United States, residing at Storms, in the county of Ross and State of Ohio, have invented a new and useful Buncher for Mowing-Machines, of which the following is a specification.

This invention relates to improvements in those machines usually termed "clover-bunchers," though useful in collecting various grasses and grains as the same are cut, the said machines being in the form of attachments that can be applied to ordinary mowing-machines.

The object of the invention is to provide certain improvements in the operating mechanism for the holding and releasing means in order that the said means may be more easily and accurately operated and will not be liable to accidental actuation, said operating mechanism also serving to maintain the holding means always in operative relation without regard to the nature of the surface over which the mower may travel.

The preferred form of construction is illustrated in the accompanying drawings, wherein—

Figure 1:
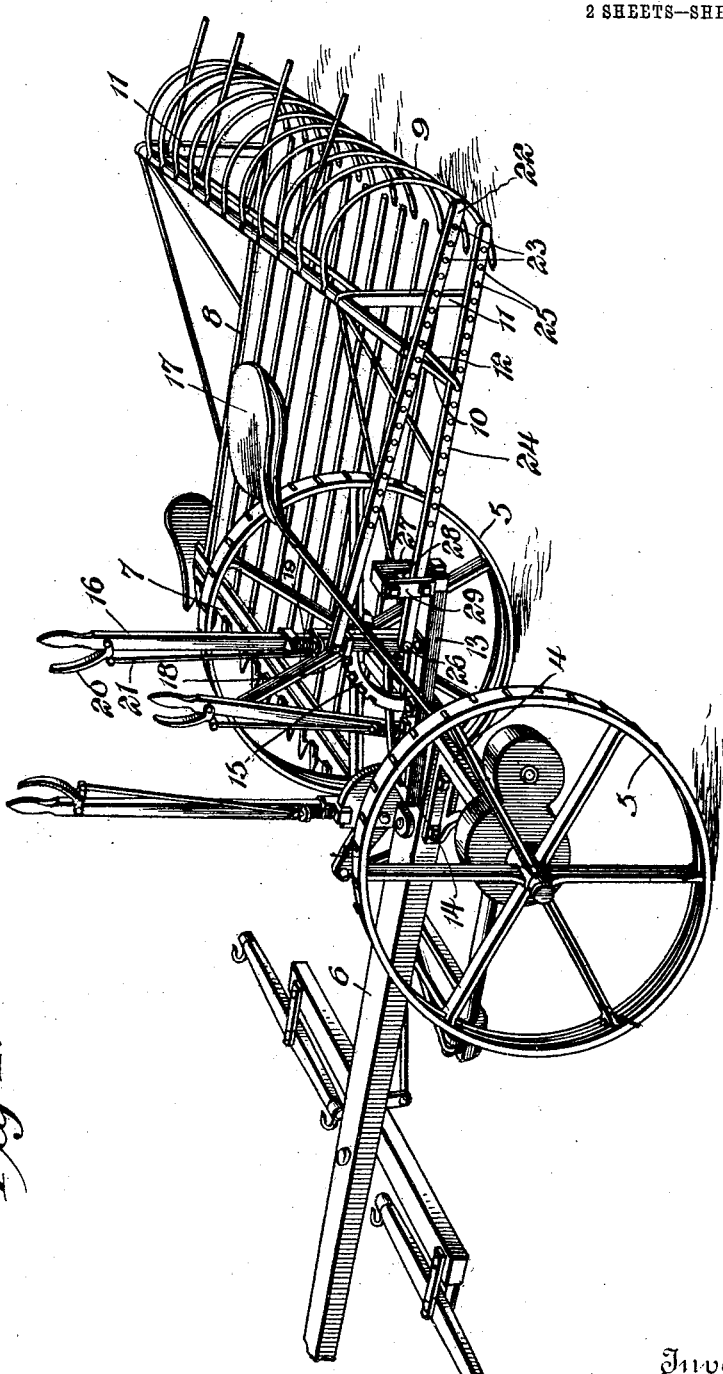
Figure 2:
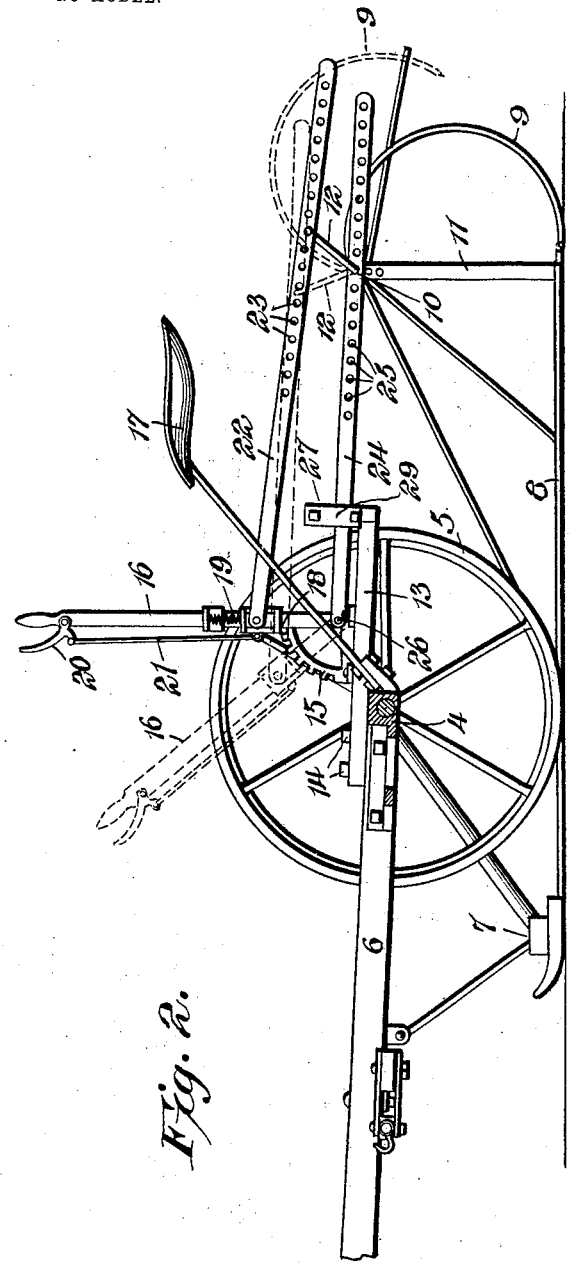
Figure 3:
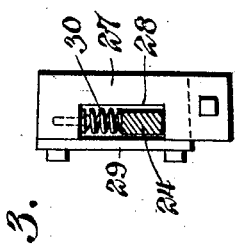

Figure 1 is a perspective view of a mowing-machine, showing a well-known type of buncher having the improvements applied thereto. Fig. 2 is a sectional view through the same. Fig. 3 is a rear elevation of the guide.

Similar reference-numerals indicate corresponding parts in all the figures of the drawings.

The mowing-machine may be of any well-known type, including the usual frame 4, supported upon wheels 5 and having attached thereto the forwardly-projecting tongue 6. To the cutter-bar 7 of this mowing-machine is attached the buncher, comprising substantially a receiving-basket formed of a slatted platform 8 and a retaining rear wall formed of curved stop-fingers 9. These stop-fingers are supported upon and actuated by a rock-shaft 10, that is journaled in the upper ends of side standards 11, and the end of said rock-shaft that is located in rear of the main frame of the mower is provided with a crank-arm 12.

So far as thus described the structure is well known, the invention relating to improvements in the means for operating and bracing the rock-shaft. This means in the present embodiment is constructed as follows:

A supporting device in the form of a bar 13 is secured by suitable means to the frame of the machine, the front end of said bar preferably resting upon the tongue and being fastened thereto by suitable bolts 14. Secured to the intermediate portion of the supporting device is an upstanding quadrant-rack 15, and to the same is pivoted the lower end of an operating hand-lever 16, said lever being preferably located at one side and in advance of the usual mower-seat 17. The lever carries a suitable holding-dog 18, that coacts with the rack, said dog being normally held in engagement with said rack by a spring 19 and being raised through the medium of a hand-grip 20, which is connected with the dog by a link 21. A link 22, pivotally secured to the lever, is provided in its rear portion with a longitudinal series of openings 23, adapted to receive the free end of the crank-arm 12. Therefore it will be apparent that when the lever is in its rearmost position and locked by the dog the stop-fingers will be lowered, as illustrated in Figs. 1 and 2, and no matter how much the material collected may bunch against the same said fingers will be positively locked against accidental elevation. The operator, however, by unlocking the lever and throwing the same forward will raise the fingers, thereby releasing the bunch from the platform. As a result a positive lock is provided for the fingers, and on account of the convenient relation of the lever not only can said lever be readily operated at the exact moment desired, but the fingers may be quickly raised. Therefore a straight windrow may be formed, as the bunches may be deposited with great accuracy. Moreover, the operating mechanism is entirely mounted upon a supporting device which can be readily attached to the machine.

In order to avoid excessive strain upon the rock-shaft contiguous to the crank-arm, the usual brace 24 is employed, said brace having in its rear portion a longitudinally-disposed series of openings 25, through one of which said rock-shaft passes. This brace extends longitudinally of the supporting-bar and is secured to the pivot 26 of the lever 16. This brace in itself is well known to the art; but as ordinarily constructed it is capable of swinging upwardly when the rock-shaft is operated. Thus in heavy work it often occurs that when the fingers are raised the rock-shaft will raise with it, and consequently the entire rear portion of the buncher will be elevated. In order to obviate this objection, there is employed in the present device means for preventing the upward movement of the brace. This means is shown in the form of a guide-block 27, secured to the rear end of the supporting device and having a passage-way 28, through which the brace 24 passes. The passage-way is open at one side of the guide-block, but is normally closed by a cap-plate 29, detachably secured thereto. It will be evident that if the brace 24 is tightly fitted in the guide-block it cannot move upwardly, and therefore the rear portion of the buncher cannot be elevated. This tight fit has proven under ordinary conditions very advantageous; but in operating over rough ground it is better to permit a slight lateral play of the brace. Therefore the height of the guideway is greater than that of the brace, and a spring 30 may be interposed between the top of the guideway and said brace for the purpose of yieldingly urging the brace downwardly, but permitting it to move upwardly under abnormal conditions. This feature of the invention is an important one, as it will be evident that the parts are thus maintained in their proper relation under all conditions of work.

From the foregoing it is thought that the construction, operation, and many advantages of the herein-described invention will be apparent to those skilled in the art without further description, and it will be understood that various changes in the size, shape, proportion and minor details of construction may be resorted to without departing from the spirit or sacrificing any of the advantages of the invention.

Having thus described my invention, what I claim as new, and desire to secure by Letters Patent, is—

1. In an attachment of the class described, the combination with a supporting device, of means for attaching the same to a mowing-machine, bunching mechanism including a rock-shaft, a brace having spaced connections with the supporting device and a connection with the rock-shaft, and an actuating-lever pivoted upon the device and having a crank connection with the rock-shaft.

2. In an attachment of the class described, the combination with a rock-shaft, of a supporting device, a brace having a journal connection with the rock-shaft and spaced connections with the supporting device, a hand-lever mounted upon the device and having a crank connection with the rock-shaft, and lever-holding means carried by said hand-lever and the supporting device.

3. In an attachment of the class described, the combination with bunching mechanism including holding-fingers and a rock-shaft for operating the same, of means for actuating said bunching mechanism, said actuating means including a supporting device, operating means mounted on the supporting device and connected to the rock-shaft, a brace connecting the supporting device and rock-shaft and being capable of movement, and means for limiting the movement of the brace upon the supporting device.

4. In an attachment of the class described, the combination with bunching mechanism, of means for securing the same to a mowing-machine, said mechanism including holding-fingers and a rock-shaft for operating the same, a supporting device, fastening means for securing the supporting device to a mowing-machine, means for actuating the rock-shaft connected thereto and mounted on the supporting device, a brace connecting the supporting device and rock-shaft, and a guide secured to the supporting device and having an engagement with the brace.

5. In an attachment of the class described, the combination with bunching mechanism including holding-fingers and a rock-shaft for operating the same, a supporting device, means for fastening the supporting device to a mowing-machine, means for actuating the rock-shaft connected thereto and mounted on the supporting device, a brace connecting the supporting device and rock-shaft, and yielding means having an engagement with the brace for permitting a slight movement thereof with respect to the supporting device.

6. In an attachment of the class described, the combination with bunching mechanism including holding-fingers and a rock-shaft for operating the same, a supporting device, means for fastening the supporting device to a mowing-machine, means for actuating the rock-shaft connected thereto and mounted on the supporting device, a brace connecting the supporting device and rock-shaft, and a spring bearing against the brace for permitting a slight yielding movement thereof.

7. In an attachment of the class described, the combination with bunching mechanism, of means for securing the same to a mowing-machine, said mechanism including holding-fingers and a rock-shaft for operating said fingers, a supporting device having a guide, means for securing the supporting device to a mowing-machine, mechanism for operating the rock-shaft connected thereto and mounted on the supporting device, and a brace connecting the supporting device and rock-shaft and passing through the guide.

8. In an attachment of the class described, the combination with bunching mechanism, of means for attaching the same to a mowing-machine, said mechanism including holding-fingers and a rock-shaft constituting a support for the holding-fingers, and means for operating the same comprising a crank-arm secured to one end of the rock-shaft, a supporting-bar having an upstanding guide, means for securing the bar to a mowing-machine, a hand-lever pivoted upon the supporting-bar, a lock for the hand-lever, a link connecting the hand-lever and crank-arm, and a brace-bar secured at one end to the pivot of the lever and having its other end connected to the rock-shaft, said brace passing through the upstanding guide.

In testimony that I claim the foregoing as my own I have hereto affixed my signature in the presence of two witnesses.

JOHN GREGG.

Witnesses:
C. W. SMITH,
L. G. DILL.